United States Patent
Einheber et al.

(10) Patent No.: US 12,544,947 B2
(45) Date of Patent: *Feb. 10, 2026

(54) FOOD SLICER ASSEMBLY

(71) Applicant: Land O'Lakes, Inc., Arden Hills, MN (US)

(72) Inventors: David A. Einheber, St. Louis Park, MN (US); Joseph V. Burger, Apple Valley, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 109 days.

This patent is subject to a terminal disclaimer.

(21) Appl. No.: 17/552,666

(22) Filed: Dec. 16, 2021

(65) Prior Publication Data

US 2022/0105651 A1 Apr. 7, 2022

Related U.S. Application Data

(63) Continuation of application No. 16/676,915, filed on Nov. 7, 2019, now Pat. No. 11,203,129.

(51) Int. Cl.
*B26D 7/01* (2006.01)
*A47J 9/00* (2006.01)
(Continued)

(52) U.S. Cl.
CPC ............... *B26D 7/01* (2013.01); *A47J 9/003* (2013.01); *B26D 1/0006* (2013.01); *B26D 1/08* (2013.01);
(Continued)

(58) Field of Classification Search
CPC . A47J 9/003; A47J 9/006; A24F 13/24; A24F 13/26; B26D 2007/0018;
(Continued)

(56) References Cited

U.S. PATENT DOCUMENTS

| | | |
|---|---|---|
| 502,170 A | 7/1893 | Brundin |
| 1,679,004 A | 7/1928 | Pinkel et al. |

(Continued)

OTHER PUBLICATIONS

Kickstarter—Tate Koenig , "The Cheese Chopper: World's Best All-In-One Cheese Device", https://www.kickstarter.com/projects/tatekoenig/the-cheese-chopper-worlds-best-all-in-one-cheese-device/description Accessed May 28, 2020), (Accessed May 28, 2020), 3 pages.

*Primary Examiner* — Boyer D Ashley
*Assistant Examiner* — Samuel A Davies
(74) *Attorney, Agent, or Firm* — Dorsey & Whitney LLP

(57) ABSTRACT

A food slicer assembly includes a housing defining a first opening and a second opening perpendicularly arranged. A slicing blade received at the second opening enters the first opening of the housing. A coupling releasably couples a food product or a food product packaging to the housing. The first opening receives a food product therethrough, the second opening receives the slicing blade therethrough, and the slicing blade slices the food product arranged in the first opening such that the food product is divided into multiple portions using the food slicer assembly. The slicing blade may pass into the first opening from a first end, and upon reaching the second end, the slicing blade seals the food slicer assembly at the first opening. The assembly may be a cheese slicer assembly for slicing a block of cheese so that a slice of cheese can be removed from the first opening.

19 Claims, 6 Drawing Sheets

(51) Int. Cl.
  *B26D 1/00* (2006.01)
  *B26D 1/08* (2006.01)
  *B26D 7/00* (2006.01)

(52) U.S. Cl.
  CPC .... *B26D 7/0006* (2013.01); *B26D 2007/0012* (2013.01); *B26D 2210/02* (2013.01)

(58) Field of Classification Search
  CPC ........ B26D 2003/286; B26D 2003/287; B26D 3/283; B26D 2003/285; B26D 7/225; B26D 7/0641; B26D 7/0683; B26D 1/08; B65D 85/76; B65D 75/70; B65D 51/2814; B65D 85/64; B65D 17/04; A01J 23/00
  USPC ..................... 83/167; 206/466; 200/278, 282
  See application file for complete search history.

(56) References Cited

U.S. PATENT DOCUMENTS

| | | | | |
|---|---|---|---|---|
| 1,708,771 | A | | 4/1929 | Noble |
| 2,102,859 | A | * | 12/1937 | Spousta .................. B26D 1/25 83/167 |
| 2,251,844 | A | | 8/1941 | Preston |
| 2,580,864 | A | | 1/1952 | Joseph |
| 2,583,595 | A | * | 1/1952 | Rodel ..................... B26D 3/20 241/94 |
| 2,650,428 | A | | 9/1953 | Taylor |
| 2,814,113 | A | | 11/1957 | Morlacchi |
| 4,122,737 | A | * | 10/1978 | Denson ................ B26B 29/063 83/468.5 |
| 4,513,501 | A | * | 4/1985 | Lee ........................ A01J 19/00 30/115 |
| 4,540,046 | A | | 9/1985 | Granger et al. |
| 4,697,488 | A | | 10/1987 | Cole |
| 4,756,083 | A | * | 7/1988 | Alonso .................... B26D 7/01 30/115 |
| 4,960,024 | A | | 10/1990 | Holcomb |
| 5,330,074 | A | * | 7/1994 | Wirsig ................. B67D 1/0001 222/386 |
| 5,345,952 | A | * | 9/1994 | Nielander ............... A24F 19/14 30/113 |
| 5,516,007 | A | * | 5/1996 | Larson ................... B65D 11/04 222/105 |
| 5,765,472 | A | * | 6/1998 | Kim ...................... B26D 3/283 83/167 |
| 6,048,014 | A | | 4/2000 | Stefanik |
| 6,153,238 | A | * | 11/2000 | Shannon ................ A23G 3/203 426/115 |
| 7,908,953 | B2 | * | 3/2011 | Yarborough ........... B65H 49/08 83/649 |
| 8,590,732 | B2 | * | 11/2013 | Vandamme .......... B65D 51/247 206/553 |
| 8,710,407 | B2 | * | 4/2014 | Heymann .............. A61B 46/23 219/439 |
| 8,757,607 | B1 | * | 6/2014 | Benaksas .............. B26B 29/063 83/761 |
| 10,765,242 | B2 | * | 9/2020 | Cook ................ B05C 17/00576 |
| 11,203,129 | B2 | * | 12/2021 | Einheber ................. B26D 7/01 |
| 2002/0112684 | A1 | * | 8/2002 | Jones ..................... F16J 15/061 123/90.38 |
| 2010/0180778 | A1 | * | 7/2010 | Walker ................... B26D 3/28 83/167 |
| 2015/0165634 | A1 | * | 6/2015 | Golomb ................. B26D 3/26 83/167 |
| 2018/0162003 | A1 | * | 6/2018 | Plichon .................. B26D 3/28 |
| 2020/0107678 | A1 | | 4/2020 | Koeng |
| 2020/0315248 | A1 | * | 10/2020 | Doner .................... A24F 13/26 |
| 2021/0045554 | A1 | * | 2/2021 | Blore ................... B65D 85/74 |

* cited by examiner

FOOD SLICER ASSEMBLY

CROSS-REFERENCE TO RELATED APPLICATIONS

This application is a continuation of U.S. patent application Ser. No. 16/676,915, filed Nov. 7, 2019, issued as U.S. Pat. No. 11,203,129 on Dec. 21, 2021, entitled "FOOD SLICER ASSEMBLY," which is incorporated by reference herein, in its entirety and for all purposes.

BACKGROUND

Semi-solid food products, such as dairy food products including cheese and butter, and other products such as tofu, are often sold in bulk form, such as 8-ounce or 1-pound blocks. Consumers commonly open the packaging of these bulk products, cut a portion of the product for cooking or consumption, and then store the remainder of the bulk product between uses. Where the bulk product is perishable, such as cheese, the remainder is commonly stored in a refrigerator. The packaging in which the bulk product is sold is typically an airtight packaging, e.g., shrink-wrapped, and is commonly sealed against the food product during the manufacturer's packaging process. Once the packaging is opened by the consumer, the seal is released and commonly the packaging is not re-sealable, or is not sealable to the same extent from the original packaging. While consumers commonly will attempt to re-wrap, or wrap the food product in other packaging, e.g., using plastic wrap or a re-sealable bag, other approaches to enclosing food products are needed.

SUMMARY OF THE INVENTION

Implementations provide a food slicer assembly that includes a housing defining a first opening and a second opening. The first opening and the second opening intersect and are arranged perpendicular to one another. The assembly also includes a slicing blade received by the housing at the second opening such that the slicing blade is configured to enter the first opening of the housing via the second opening. A coupling of the assembly is configured to releasably couple a food product or a food product packaging to the housing. The first opening is configured to receive a food product therethrough, the second opening is configured to receive the slicing blade therethrough, and the slicing blade is configured to slice the food product arranged in the first opening such that the food product can be divided into multiple portions using the food slicer assembly.

Other implementations provide a food slicer assembly that includes a housing defining a first opening and a second opening. The first opening and the second opening intersect and are arranged perpendicular to one another. The assembly also includes a slicing blade received by the housing at the second opening such that the slicing blade is configured to enter the first opening of the housing via the second opening. A coupling of the assembly is configured to releasably couple food packaging to the housing. The first opening is configured to receive a food product therethrough, the second opening receives the slicing blade, and the slicing blade is configured pass into the first opening from a first end of the first opening to a second end of the first opening, and upon reaching the second end, the slicing blade seals the food slicer assembly at the first opening.

Still other implementations provide a cheese slicer assembly including a housing defining a first opening and a second opening. The first opening and the second opening intersect and are arranged perpendicular to one another. A cheese slicing blade of the assembly is received by the housing at the second opening such that the slicing blade is configured to enter the first opening of the housing via the second opening. A coupling of the assembly is configured to releasably couple cheese packaging to the housing. The first opening is configured to receive a block of cheese therethrough, the block of cheese extending from the cheese packaging and into the first opening, the second opening is configured to receive the cheese slicing blade, and the slicing blade is configured to slice the cheese arranged in the first opening such that a slice of cheese can be removed from the first opening.

In various implementations and alternatives, the slicing blade seals the food slicer assembly at the first opening by contacting a seal arranged around a periphery of the first opening.

In various implementations and alternatives, the first opening of the housing includes a seal configured to seal against the housing and the slicing blade. In such implementations and alternatives, the seal may be configured as an L-shaped seal and/or as a lip seal.

In various implementations and alternatives, the coupling including a coupler configured to be received by the housing, wherein the coupler is configured to couple the food product packaging to the housing. In such implementations and alternatives, the coupler is configured to releasably couple to the housing.

In various implementations and alternatives, the coupling defines an opening that is larger than or about the same size as the first opening of the housing, and/or the coupling is configured to seal the food product packaging against the housing, and/or the first opening is adjustable such that the first can be adjusted to receive the food product.

DETAILED DESCRIPTION

Implementations provide a food slicer assembly for use in slicing food products. The food slicer assembly is configured to seal the food product within the slicer assembly and seal against the packaging in which the food product is housed, for instance, in order to maintain freshness.

Figure 1A:
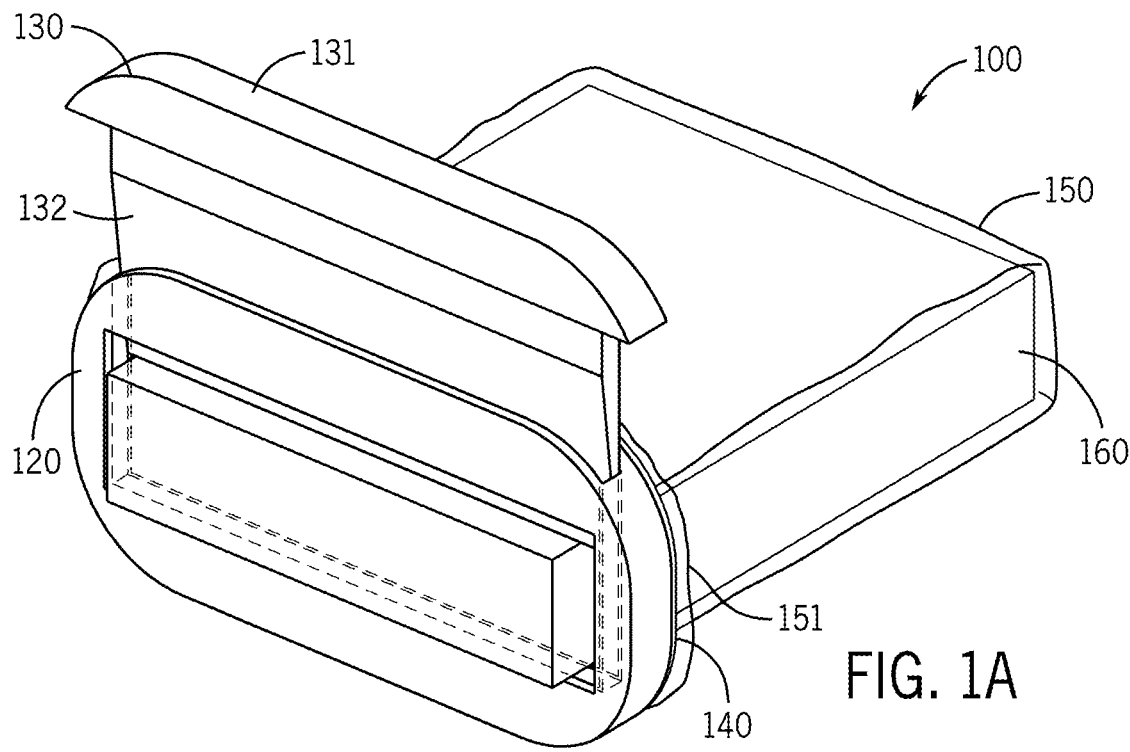
FIGS. 1A-1C illustrate a food slicer assembly in various states of use in accordance with implementations of the present disclosure.
Figure 1B:
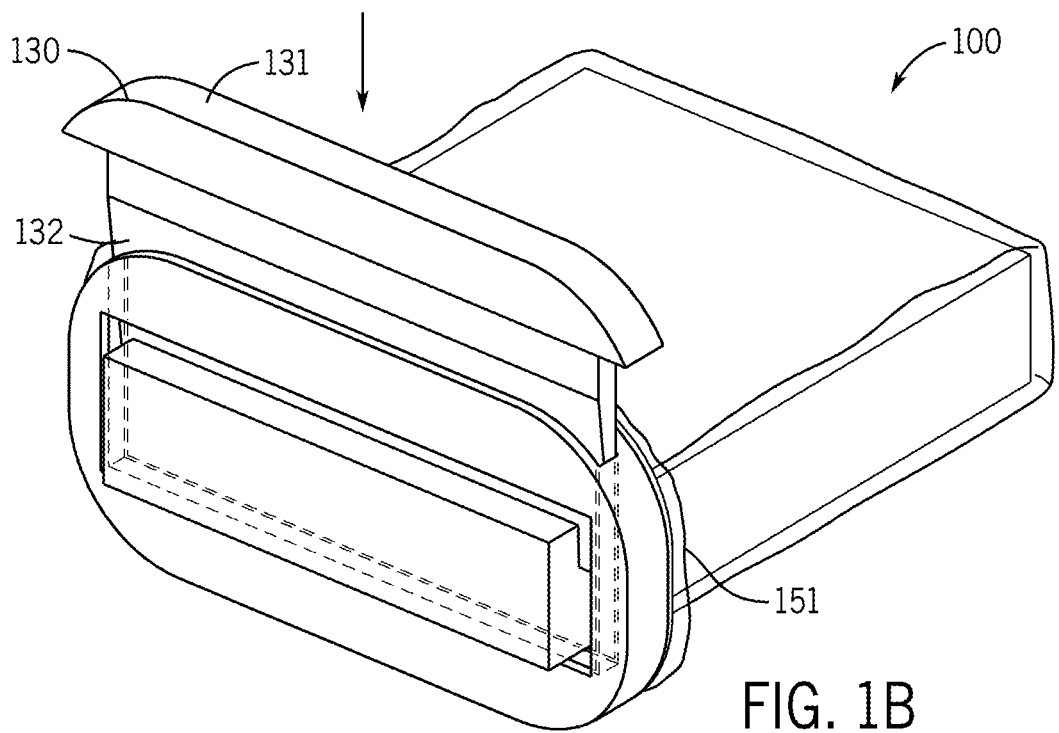
Figure 1C:
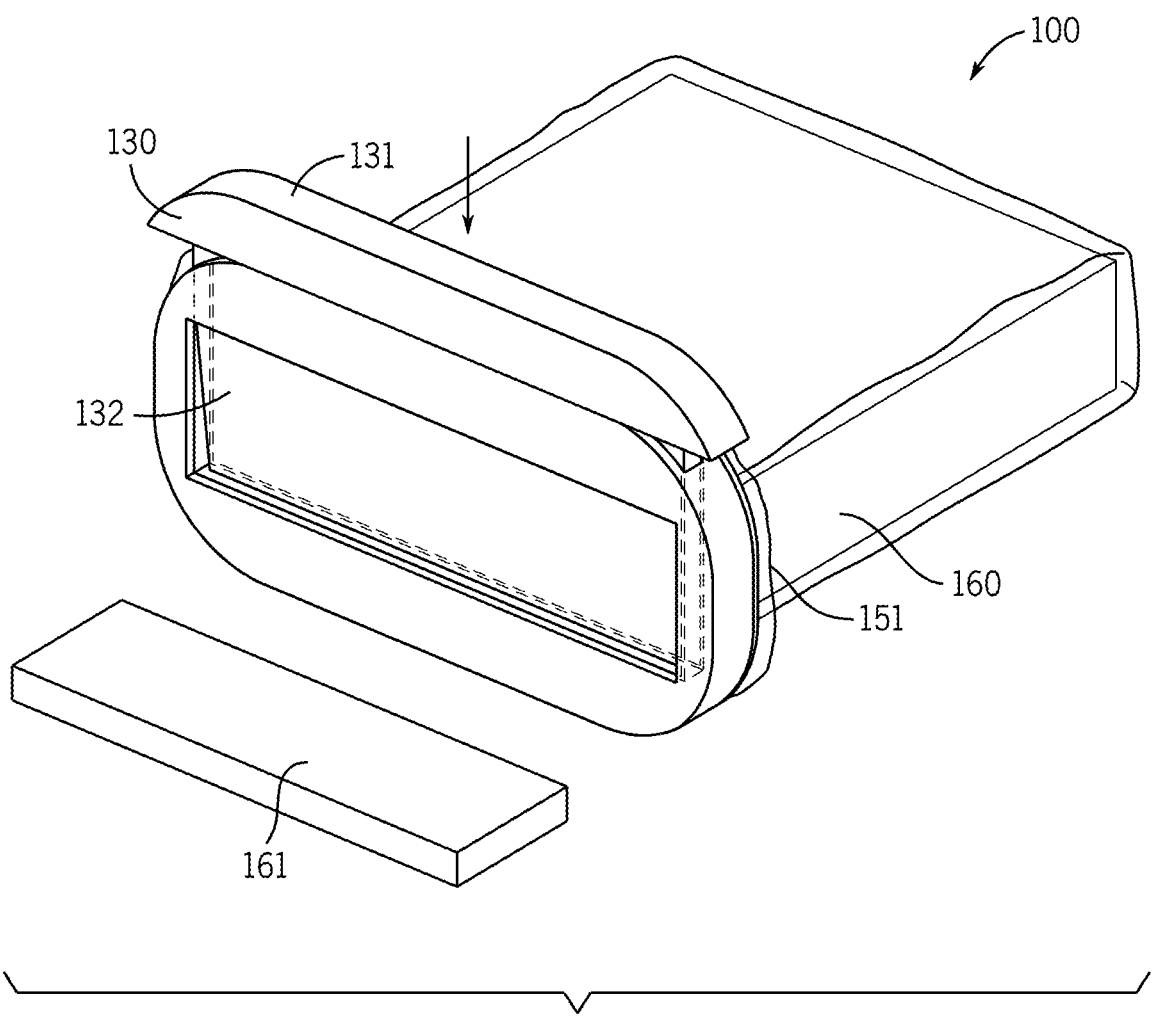

FIGS. 1A-1C illustrate a food slicer assembly 100 in various stages of slicing a food product, in accordance with implementations of the present disclosure. Referring to FIG.

1A, a food slicer assembly 100 is illustrated in accordance with implementations of the present disclosure. The food slicer assembly 100 includes a housing 120, a slicing blade 130, and a coupling 140 for coupling to the food slicer assembly 100 a packaging 150 holding a food product 160. The food product 160 contained in the packaging 150 is sliceable using the presently described food slicer assembly 100, and is sometimes referred to as a sliceable food product. The housing 120 includes a first side 121 (FIG. 5), a second side 122 (FIG. 6), external end walls 123, a first opening 124, internal sidewalls 125, a second opening 126, one or more couplers 127 (FIG. 6), and a groove 128.

As illustrated in FIG. 1A, the food slicer assembly 100 receives a slicing blade 130 at the second opening 126 of the housing 120. The slicing blade 130 is configured to slice the food product arranged in the first opening 124 of the housing 120 such that the food product 160 can be divided into multiple portions using the food slicer assembly 100. FIG. 1B illustrates the slicing blade 130 as it slices into the food product 160 extending through the housing 120. A handle 131 of the slicing blade 130 is for example forced in a direction towards the housing 120 through the second opening 126 and into the first opening 124, and the cutting portion 132 of the slicing blade 130 contacts the food product 160 to slice into and through the food product 160. FIG. 1C illustrates the slicing blade 130 after slicing through the food product 160 to form a slice 161 of the food product 160. According to certain implementations, when additional slices of the food product are desired, the slicing blade 130 can simply be withdrawn from the housing 120 (or a portion thereof) via the second opening 126, the food product 160 may be advanced into the housing 120, and the slicing blade 130 may be forced towards the housing 120 so that the slicing blade 130 slices the food product 160.

As shown in FIG. 1C, the slicing blade 130 serves as a closure for the food slicer assembly 100. In some implementations, a seal is provided between the slicing blade 130 and the housing 120. For instance, the slicing blade 130 may be configured to pass into the first opening 124 from a first, and upon reaching a second end, the slicing blade 130 seals the food slicer assembly 100 at the first opening 124. The ability to close-off the food slicer assembly 100 using the slicing blade 130 enables the food product 160 to remain sealed within the food slicer assembly 100 and its packaging 150. By coupling the food slicer assembly 100 to the packaging 150 at a packaging periphery 151, the food product 160 may remain fresher longer compared to when the food product is used with the packaging 150 alone, as the packaging itself is typically not sealable. The assembly 100 may be reusable and releasably attachable to various food product packages, such as food product packaging 150. For instance, when the food product 160 has been sufficiently sliced using the food slicer assembly 100, the packaging 150 and any remaining food product 160 may then be removed, and a new food product and its associated packaging may be attached to the food slicer assembly 100 for slicing and sealing.

Figure 2A:
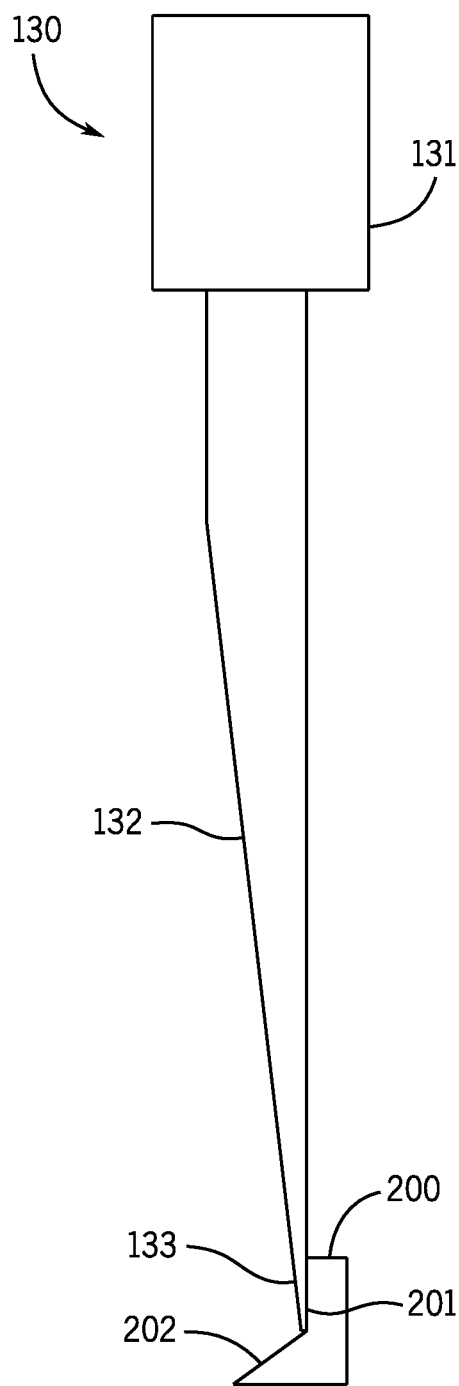
FIGS. 2A and 2B illustrate a cross-section view of the slicing blade of the food slicer assembly in accordance with implementations of the present disclosure.
Figure 2B:
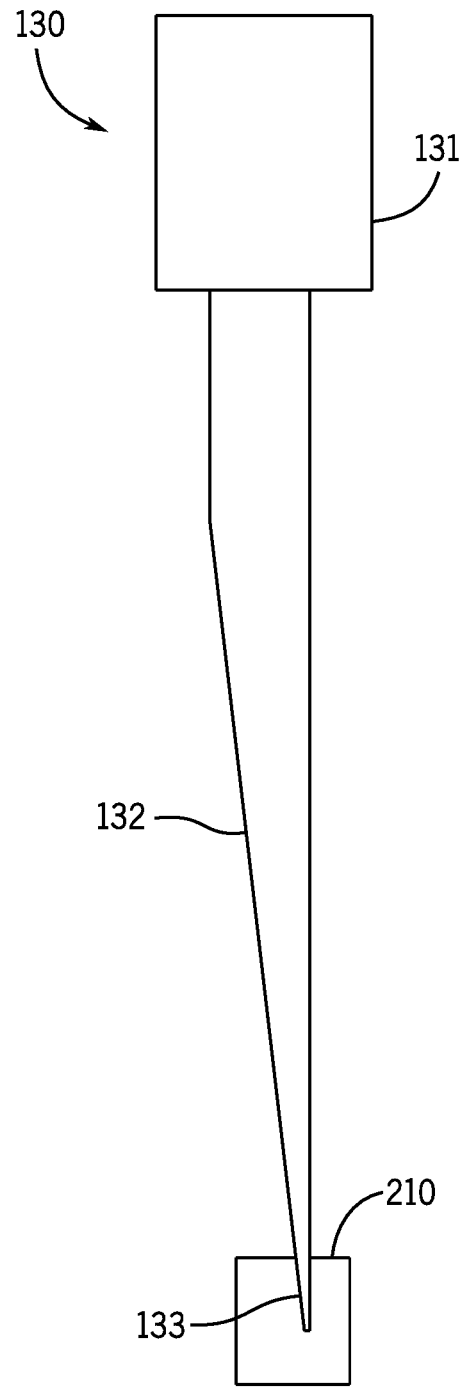

In some implementations, the first opening 124 of the housing 120 may include a seal 200, 210 configured to seal against the slicing blade 130. With reference to FIGS. 2A and 2B, illustrated is a cross-section view of the slicing blade 130 with a tip 133 of the slicing blade 130 mated against the seal 200, 210, respectively. In FIG. 2A, the seal 200 may be configured as an L-shaped seal, where the tip 133 of the slicing blade 130 rests against an elongated portion 201 of the L-shape seal, and the widened portion 202 of the seal 200 may face away from the food product 160 arranged in the housing 120 so that when the slicing blade 130 forms a closure and the sliced food is urged out of the assembly 100, i.e., towards the widened portion 202 of the seal 200. In FIG. 2B, the seal 210 may be configured as a lip seal or a U-shaped seal. In this configuration, the slicing blade 130 may rest within a depression formed in the seal 210. The seal 200, 210 may extend along the housing 120 such that the tip 133 of the slicing blade 130 mates with the seal 200, 210. In some implementations, the slicing blade 131 may seal the food slicer assembly 100 at the first opening 124 by contacting the seal 200, 210 arranged around a periphery of the first opening 124. For instance, opposing ends 134, 135 of the slicing blade 130 that are arranged perpendicular relative to the tip 133, and the portion of the slicing blade 130 proximate the second opening 126 may also mate with the seal 200, 210.

Figure 3:
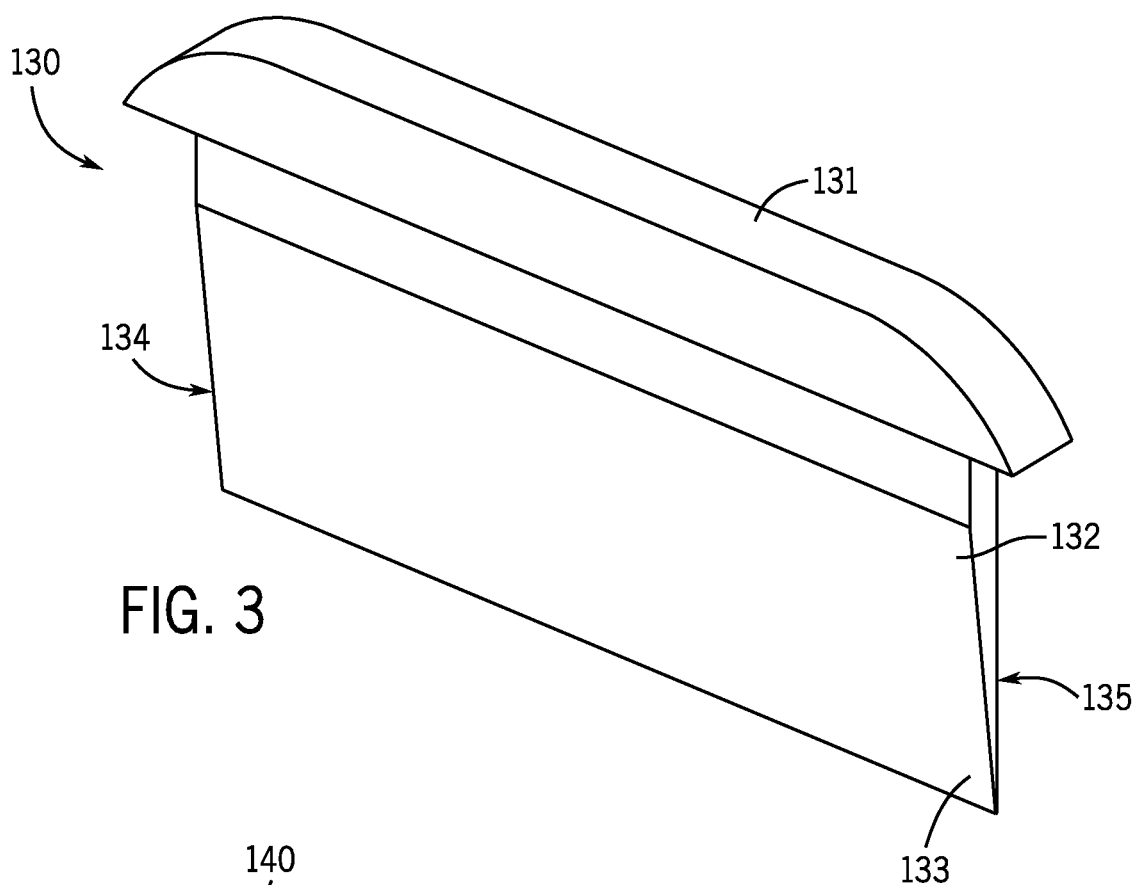
FIG. 3 illustrates an isometric view of the slicing blade in accordance with implementations of the present disclosure.

FIG. 3 illustrates an isometric view of the slicing blade 130 of the food slicer assembly 100. The slicing blade 130 includes the handle 131, the cutting portion 132 and a tip 133 that runs along a length of the slicing blade 130, arranged between the opposing ends 134, 135 of the slicing blade 130. The slicing blade 130 may be constructed of a variety of materials including but not limited to polyethylene, polypropylene, other polymers, metal, and combinations thereof. In some embodiments, the slicing blade is dishwasher safe. The handle 131 of the slicing blade may be integrally formed with or may be joined to the slicing blade 130. The cutting portion 132 of the slicing blade 130 may narrow to form the tip 133 for ease of cutting the sliceable food product. In some embodiments, the cutting portion 132 may taper on one side of the slicing blade 130 and not the other. The side of the slicing blade 130 that is not tapered may face inwardly such that the opposing ends 134, 135 of the slicing blade and the length of the slicing blade 130 mate with the seal 200, 210. See e.g., FIGS. 2A and 2B.

Figure 4:
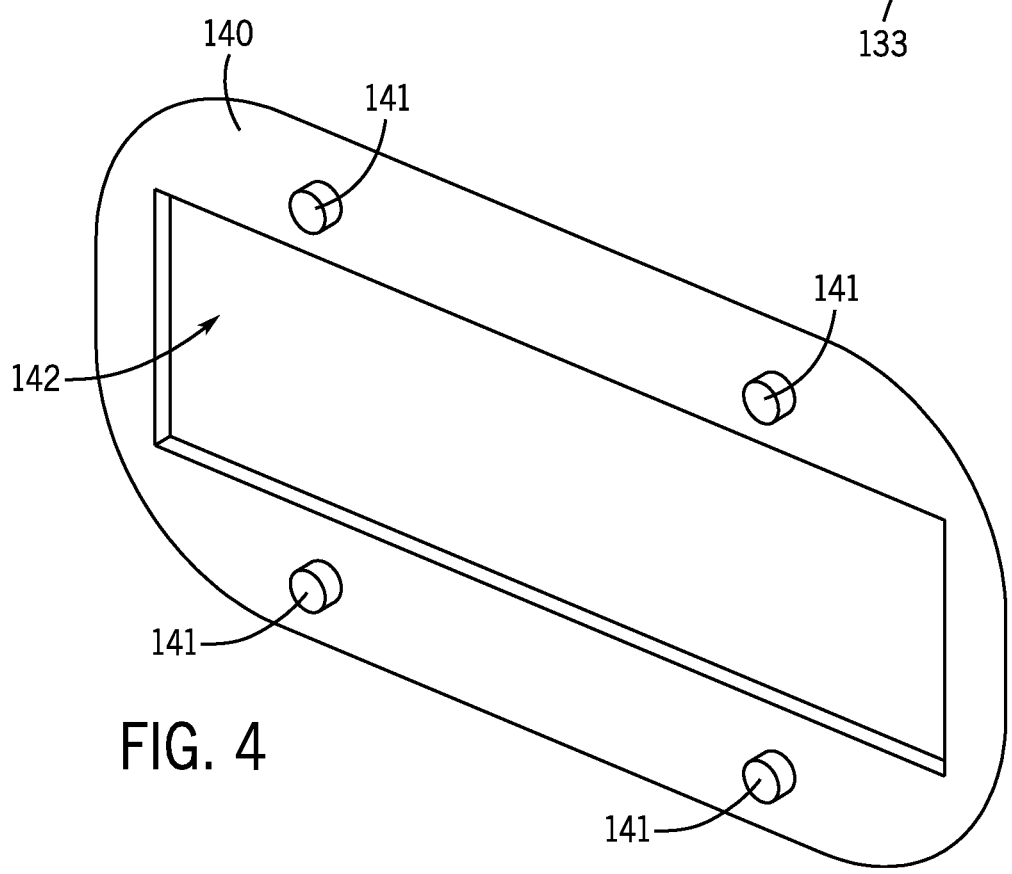
FIG. 4 illustrates an isometric view of the coupling of the food slicer assembly in accordance with implementations of the present disclosure.

FIG. 4 illustrates an isometric view of the coupling 140 for coupling to the housing 120 and adjoining the packaging 150 or the food product 160 to the food slicer assembly 100. The coupling 140 includes couplers 141 configured to mate with the couplers 127 of on the housing 120. In some embodiments, the couplers 141 are configured as protrusions, such as when the couplers 127 of the housing are configured as recesses. It will be appreciated that the couplers 141 may be configured in a variety of ways and may include other or additional attachment features. The couplers 141 may be releasably attachable to the couplers 127 of the housing 120. The coupling 140 defines an opening 142 configured to receive the food product 160 therethrough. The opening 142 may be sized similarly to the first opening 124 of the housing 120. For instance, the coupling 140 may define an opening that is larger than or about the same size as the first opening of the housing.

Figure 5:
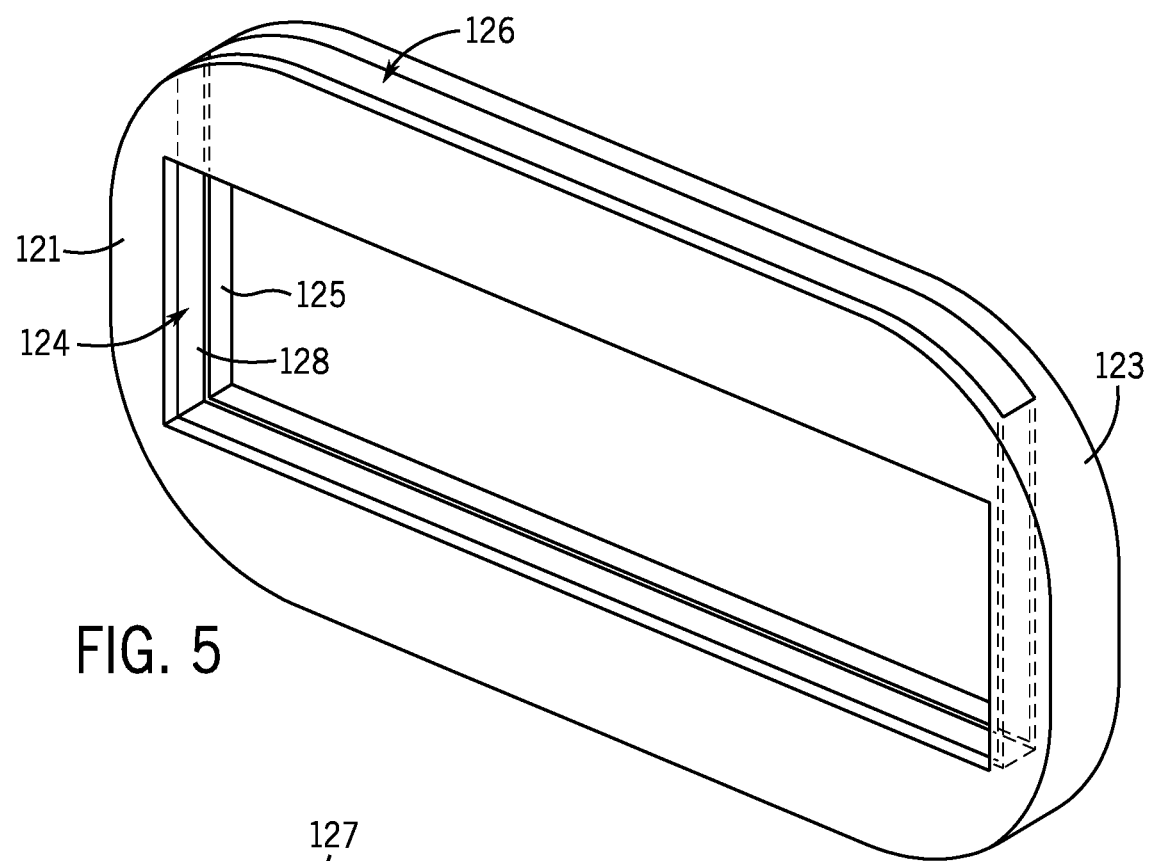
FIGS. 5, 6, and 7 illustrate a front isometric view, a back isometric view, and a top view, respectively, of the housing of the food slicer assembly in accordance with implementations of the present disclosure.
Figure 6:
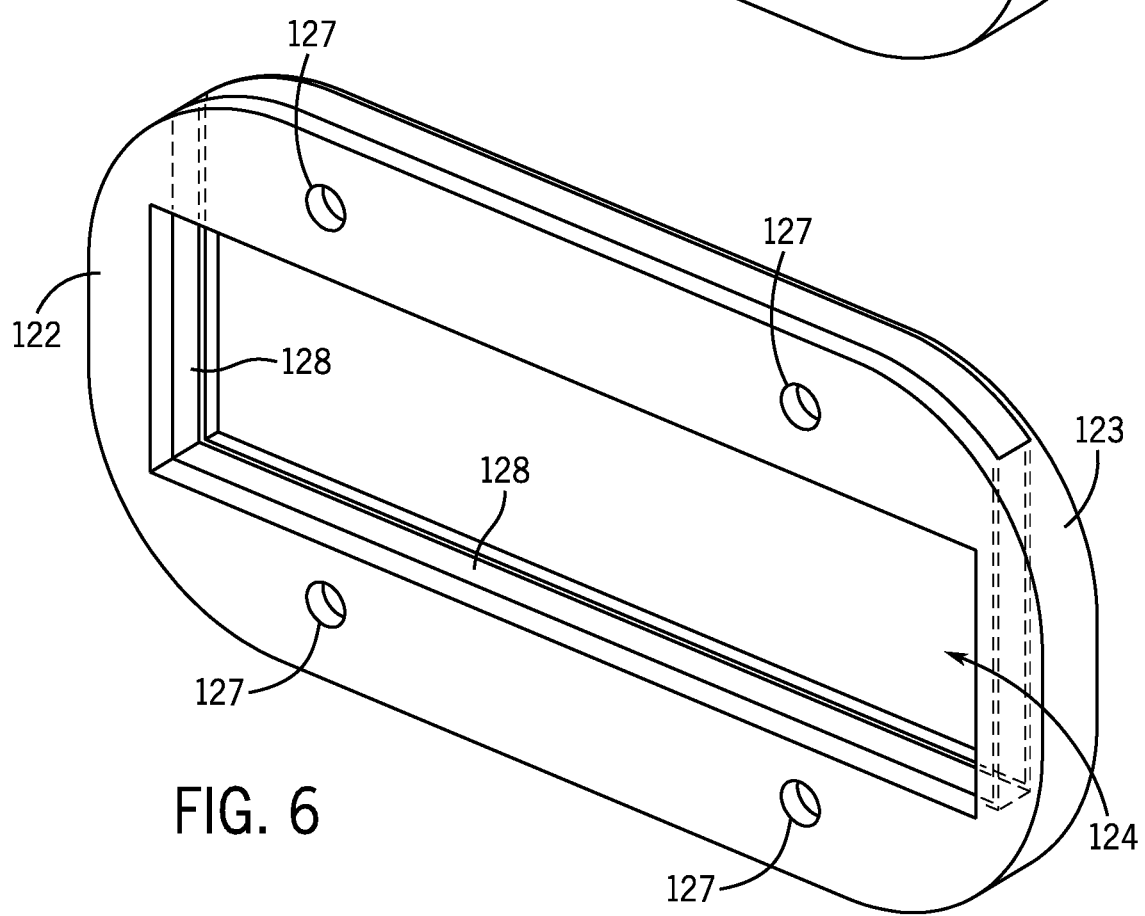
Figure 7:
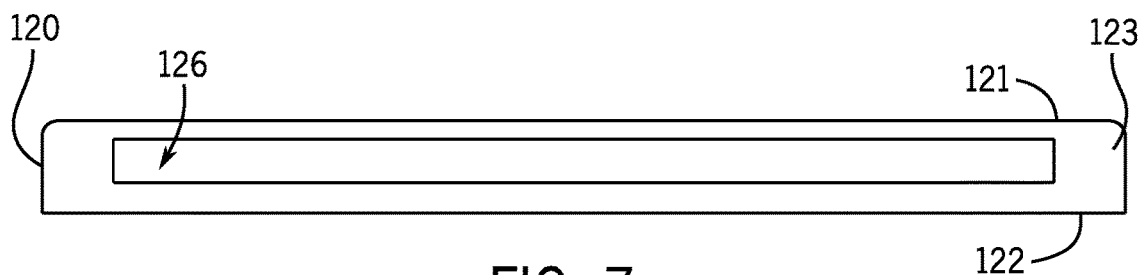

With reference to FIGS. 5, 6 and 7, the housing 120 is illustrated in detail and defines a first side 121 (FIG. 5), a second side 122 (FIG. 6), and external end walls 123 extending between first side 121 and second side 122. A first opening 124 extends through the housing 120 from the first side 121 to the second side 122 and the first opening 124 defines internal sidewalls 125 of the housing 120. A second opening 126 of the housing 120 extends through the external end wall 123 and into the first opening 124 via the internal sidewall 125 of the first opening 124. The internal sidewall 125 of the housing 120 defining the first opening 124 therefore additionally defines a portion of second opening 126, while an external end wall 123 of the housing 120 defines another portion of the second opening 126 (see FIG.

7). One or more couplers 127 (FIG. 6) are configured to receive coupling 140 such that the housing 120 and coupling 140 can be coupled.

The first side 121 of the housing 120 may be configured for food product egress such that the food product 160 can be moved through and out of the housing 120, and separated into one or more pieces (e.g., piece 161) upon slicing. The second side 122 of the housing 120 may be configured for food product ingress such that the food product 160 can be moved into the housing 120. Each of the first side 121, second side 122, and/or the end walls 123 of the housing 120 may be configured for a user to grasp or hold the assembly 100 for movement of the food product 160 through the assembly 100 and for slicing the product into pieces.

The first opening 124 of the housing 120 may be sized and shaped to receive a food product therethrough (e.g., food product 160) such that the food product is received at the housing 120, extends through the housing 120, and exits the housing 120 via the first opening 124. Upon slicing, the piece 161 of food product 160 may be removed from the first opening 124. The first opening 124 may be shaped to accept the food product intended to be sliced, and may elongated in shape, such as rectangular in shape to receive a block of cheese for example, and as illustrated in FIGS. 5 and 6. It will be appreciated that food products take a variety of shapes, however, and the first opening 124 may be sized and shaped to receive a variety of sliceable food products, and may be shaped as an elongated circle, a square, or any shape adapted to receive the sliceable food product for example.

The internal sidewall 125 of the housing 120 defines the first opening 124 and may extend from the first side 121 to the second side 122 of the housing 120. The internal sidewall 125 may also define a recess 128 or a groove configured to receive a seal such as seals 200, 210 a lip seal or an L-shaped seal around one or more sides of the internal sidewall 125. The recess 128 may also be configured to receive the slicing blade 130, and for instance the slicing blade 130 may be received along the recess 128 with the seal 200, 210 arranged between the slicing blade 130 and the recess 128. In some implementations, the recess 128 and/or the seals 200, 210 may be configured to taper in order to conform to a shape of the sliding blade 130, and for instance may narrow where the tip 133 of the slicing blade 130 is received. Another side of the internal sidewall 125 defines the second opening 126. The housing 120 may further include an adjustable opening, such as an adjustable aperture (not shown) defined by or proximate the first opening 124 such that the housing 120 is adjustable to receive a variety of different shaped food products.

The second opening 126 of the housing 120 may be configured to receive the slicing blade 130 of the food slicer assembly 100. The second opening 126 extends from an external end wall 123 of the housing 120 to the internal sidewall 125 of the housing 120. Accordingly, the first opening 124 and the second opening 126 intersect and may be arranged perpendicular to one another. The second opening 126 may be sized and shaped to define an internal dimension that is slightly larger than the external dimension of the slicing blade 130, or the portion thereof that is received through the second opening 126. In some implementations, the slicing blade 130 proximate the handle 131 may have an external surface dimension that enables the slicing blade 130 to be received by a friction fit within the second opening 126 of the housing 120 and may facilitate sealing the slicing blade 130 against the housing 120 when the slicing blade 130 is inserted therein (see FIG. 1C). The second opening 126 may be aligned with or slightly offset from the recess 128 as described herein. In some implementations, the seal 200, 210 may extend along the second opening 126 to provide an improved air-tight seal. For instance the seal 200, 210 may extend along one or more sides of the opening 126 such as at a boundary of the internal sidewall 125, or may extend up to one or both sides of the opening 126.

One or more couplers 127 may be provided on the housing 120 for receiving the coupling 140. The couplers 127 and the coupling 140 may be configured to seal food product packaging 150 against the housing 120, e.g., by sealing the packaging periphery 151 between the housing 120 and the coupling 140. In FIG. 6, the couplers 127 are configured as recesses. In this example, the coupling 140 may include protrusions adapted to be received in the recesses. It will be appreciated that the couplers 127 may be configured in a variety of ways and may include other or additional attachment features. The couplers 127 may be releasably attachable to the coupling 140.

Figure 8:
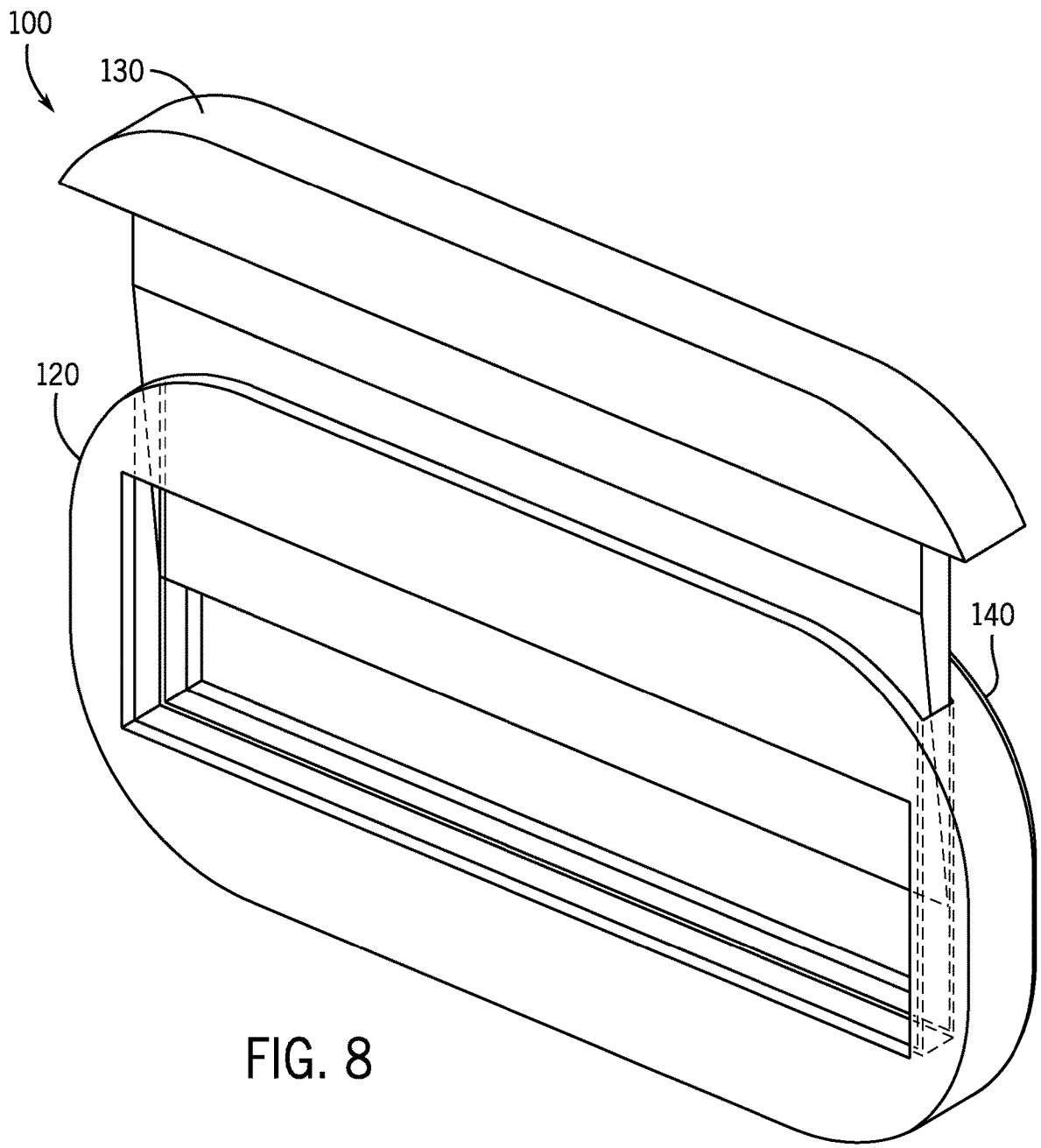
FIG. 8 illustrates the food slicer assembly 100 in an assembled state in accordance with implementations of the present disclosure.

FIG. 8 illustrates the food slicer assembly 100 in an assembled state with the housing 120 slicing blade 130 and coupling 140 joined thereto. In use, the coupling 140 may be detached from the housing 120 and food product packaging 150 and the housing 120 may be placed against each other and the coupling 140 may be coupled to the housing 120 with a portion of the packaging periphery 151 arranged and detachably fixed therebetween (see FIGS. 1A-1C). In some implementations, the packaging 150 may be configured to be received by the food slicer assembly 100. For instance, the packaging 150 may include couplers for coupling with coupling 140 or couplers 127. In other implementations, the packaging 150 may be off-the-shelf packaging. In further implementations, the food slicer assembly 100 may be configured to alter the packaging 150 in order to facilitate attaching the food product packaging 150 thereto. For instance, the couplers 127/141 may be configured to form a friction fit with the food product packaging periphery 151, and/or may be configured to pierce the food product packaging periphery 151 such that the couplers 127/141 may be directly coupled. In some implementations, the housing 120 and the coupling 140 may define a seal or sealing portions configured to seal against the food product packaging 150.

What is claimed is:

1. A food slicer assembly, comprising:
    a housing defining a first opening and a second opening, wherein the first opening and the second opening intersect and are arranged perpendicular to one another;
    a slicing blade received by the housing at the second opening such that the slicing blade is configured to pass through the second opening and enter the first opening of the housing via the second opening, the housing having a first side and a planar second side with the first opening extending therebetween and having an elongated shape; and
    a coupling configured to releasably couple a periphery of a deformable packaging for a food product to the housing between the planar second side of the housing and a planar side of the coupling, the coupling defining an elongated through-hole aligned with the first, elongated shaped opening of the housing when the food slicer assembly is assembled in the absence of the deformable packaging,
    wherein the coupling comprises couplers spaced away from the elongated through-hole along the respective planar second side of the housing and the planar side of the coupling;

wherein the planar second side of the housing and the planar side of the coupling, when coupled, are flush, and wherein the slicing blade is configured to slice a food product arranged in the first opening as the slicing blade moves through the first opening and into a closed position, and upon reaching the closed position, the slicing blade seals the housing and the deformable packaging from an outside environment.

2. The assembly of claim 1, wherein the first opening of the housing comprises a seal configured to seal against the housing and the slicing blade when the slicing blade is in the closed position.

3. The assembly of claim 2, wherein the seal is configured as an L-shaped seal.

4. The assembly of claim 2, wherein the seal is configured as a lip seal.

5. The assembly of claim 1, wherein the couplers along the planar side of the coupling are configured to be received by the housing.

6. The assembly of claim 5, wherein the couplers along the planar side of the coupling are configured to releasably couple to the housing.

7. The assembly of claim 1, wherein the elongated through hole of the coupling defines a third opening and the third opening is larger than or about the same size as the first opening of the housing.

8. The assembly of claim 7, wherein the first opening aligns with the third opening.

9. A cheese slicer assembly, comprising:
a housing defining a first opening and a second opening, wherein the first opening and the second opening intersect and are arranged perpendicular to one another with the first opening having an elongated shape;
a cheese slicing blade received by the housing at the second opening such that the slicing blade is configured to enter the first opening of the housing via the second opening; and
a coupling configured to releasably couple deformable packaging for cheese to the housing,
wherein the coupling includes at least one first coupler configured to mate with at least one second coupler on the housing such that when the coupling and the housing are coupled by one of the first coupler or the second coupler protruding into and being received by the other of the first coupler or the second coupler, a periphery of the deformable packaging is between the coupling and the housing, thereby sealing the deformable packaging from an outside environment when the slicing blade is in a closed position, the coupling defining an elongated through-hole aligned with the first, elongated shaped opening of the housing,
wherein the coupling has a first side and a second side and the sides are planar and parallel,
wherein the first coupler and second coupler are spaced away from the elongated through-hole of the coupling and the housing.

10. The cheese slicer assembly of claim 9, wherein at least one of the first coupler and the second coupler comprises a plurality of protrusions extending from the planar surface of the first coupler or the second coupler and the other of the first coupler and the second coupler comprises a plurality of recesses defined in the planar surface of the other of the first coupler or the second coupler and configured to receive the plurality of protrusions, and wherein the recesses and the protrusions are configured to form a friction fit with the deformable packaging.

11. The cheese slicer assembly of claim 9, wherein at least one of the first coupler and the second coupler comprises a plurality of protrusions configured to pierce the deformable packaging and the other of the first coupler and the second coupler comprises a plurality of recesses configured to receive the plurality of protrusions such that the first coupler and the second coupler can be directly coupled.

12. A food slicer assembly, comprising:
a housing comprising external sidewalls surrounding a first side and a planar second side and defining an elongated exterior shape of the housing, wherein a first opening of the housing extends between the first and second sides and defines an elongated shape, wherein a second opening of the housing intersects and is arranged perpendicular to the first opening;
a slicing blade received by the housing at the second opening such that the slicing blade is configured to pass through the second opening and enter the first opening of the housing via the second opening; and
a coupling configured to releasably couple a periphery of a deformable packaging for a food product to the housing between the planar second side of the housing and a planar side of the coupling, the coupling defining an elongated exterior shape and an elongated through-hole that have a same shape as the housing elongated exterior shape and elongated through-hole such that the when the housing and the coupling are coupled, the elongated exterior shapes and the elongated through-holes are aligned and the planar second side of the housing and the planar side of the coupling are flush, and
wherein the slicing blade is configured to slice a food product arranged in the first opening as the slicing blade moves through the first opening and into a closed position, and upon reaching the closed position, the slicing blade seals the housing and the deformable packaging from an outside environment.

13. The assembly of claim 12, wherein the slicing blade seals the food slicer assembly at the first opening by contacting a seal arranged around a periphery of the first opening when the slicing blade is in the closed position.

14. The assembly of claim 13, wherein the seal is an L-shaped seal.

15. The assembly of claim 13, wherein the seal is a lip seal.

16. The assembly of claim 12, wherein the coupling is configured to be releasably couplable to the housing.

17. The assembly of claim 12, wherein the coupling includes at least one coupler configured to mate with at least one coupler on the housing.

18. The assembly of claim 12, wherein the coupling includes a first coupler comprising a plurality of protrusions extending from the planar side thereof and a second coupler comprising a plurality of recesses defined in the planar second side of the housing configured to receive the plurality of protrusions, and wherein the recesses and the protrusions are configured to form a friction fit with the deformable packaging.

19. The assembly of claim 12, wherein the coupling includes at least one coupler on the planar side thereof configured to mate with at least one coupler on the planar second side of the housing such that the planar side of the coupling is flush with the planar second side of the housing when the coupling and the housing are coupled.

* * * * *